April 8, 1924.
A. T. BROWN ET AL
FRICTION CLUTCH
Filed Aug. 2, 1919
1,489,423
2 Sheets-Sheet 1
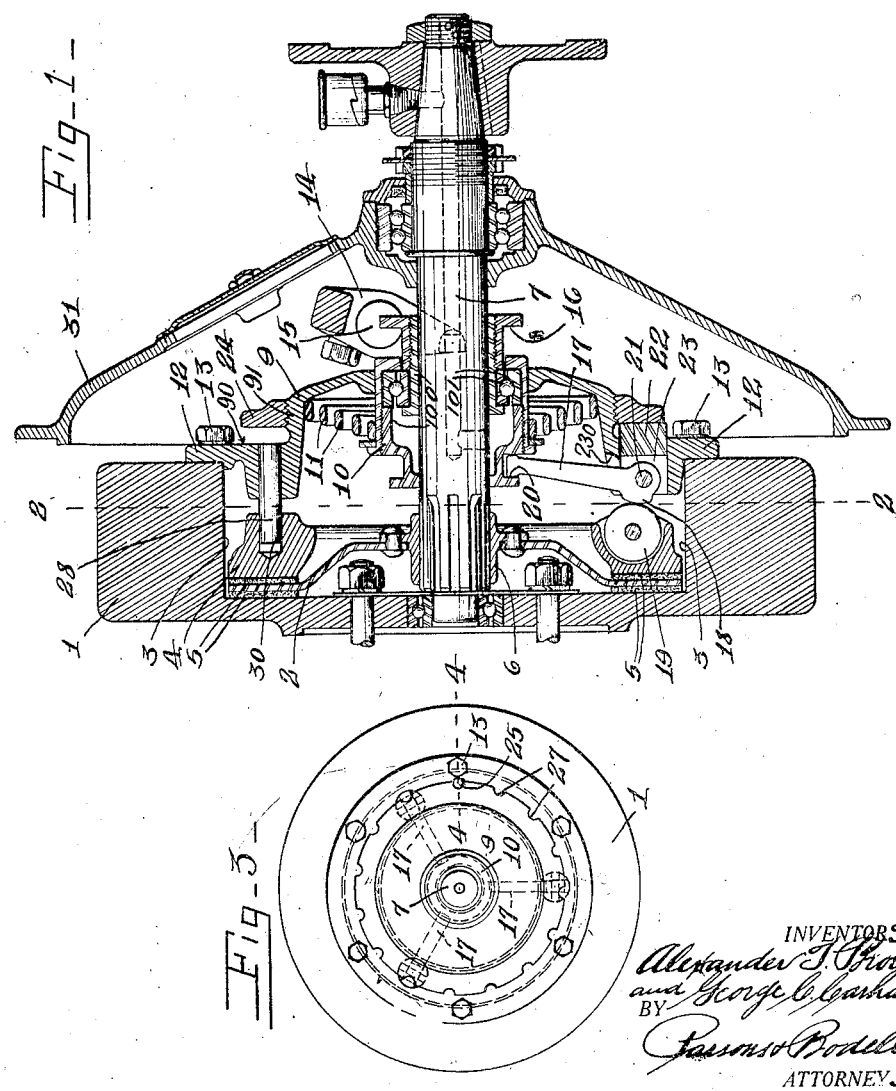
INVENTORS
Alexander T. Brown
and George C. Garhart
BY
Parsons & Bodell
ATTORNEYS.

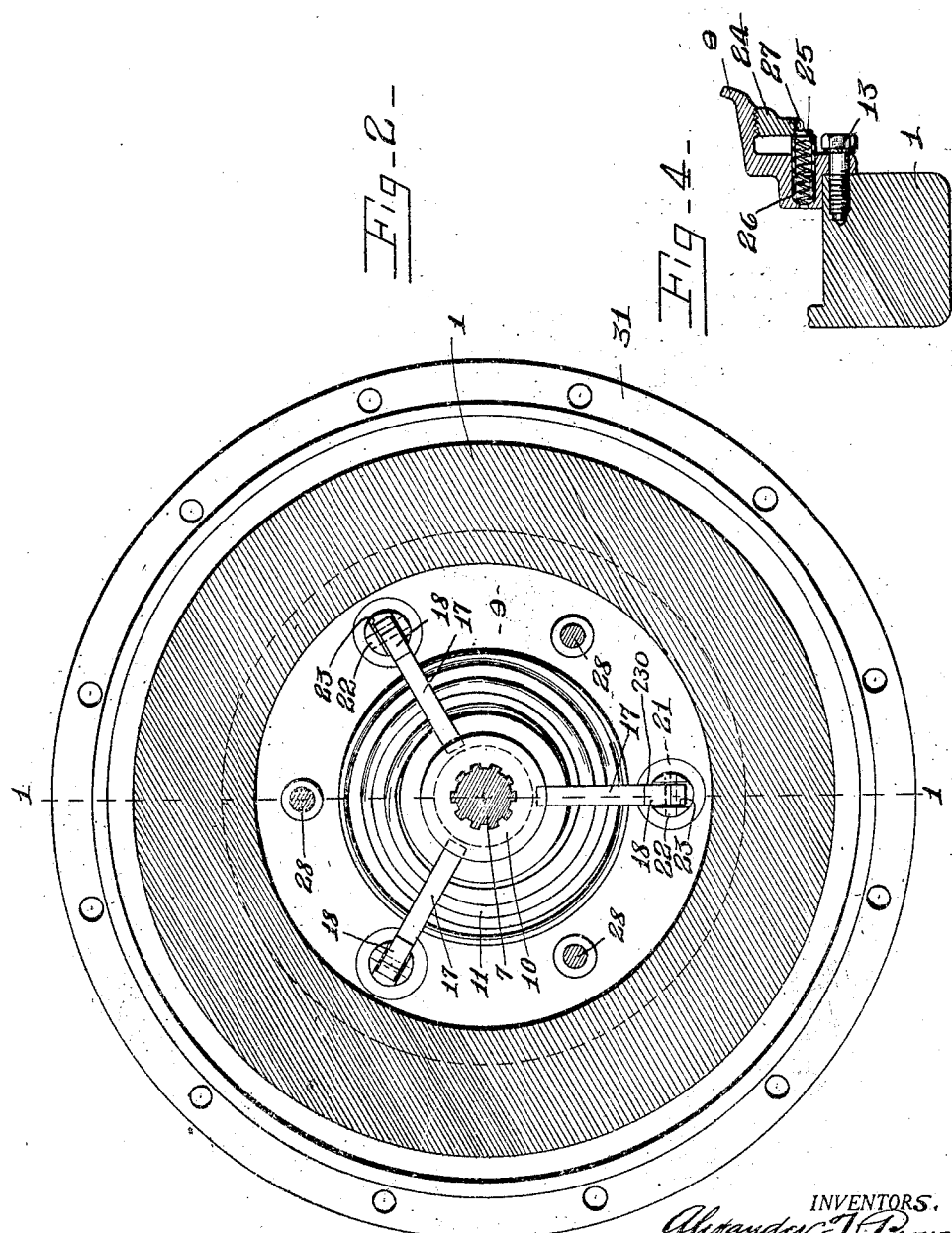

Patented Apr. 8, 1924.

1,489,423

UNITED STATES PATENT OFFICE.

ALEXANDER T. BROWN AND GEORGE C. CARHART, OF SYRACUSE, NEW YORK, ASSIGNORS TO BROWN-LIPE GEAR COMPANY, OF SYRACUSE, NEW YORK, A CORPORATION OF NEW YORK.

FRICTION CLUTCH.

Application filed August 2, 1919. Serial No. 315,019.

*To all whom it may concern:*

Be it known that we, ALEXANDER T. BROWN and GEORGE C. CARHART, citizens of the United States, and residents of Syracuse, in the county of Onondaga and State of New York, have invented a new and useful Friction Clutch, of which the following is a specification.

This invention relates to friction clutches, as disk or plate clutches, and has for its object a clutch which is particularly simple and compact in construction, and highly efficient and durable in use.

In describing this invention, reference is had to the accompanying drawings, in which like characters designate corresponding parts in all of the views.

Figure 1 is a longitudinal sectional view of one form of this clutch construction, the same being taken on line 1—1, Fig. 2.

Figure 2 is a sectional view on line 2—2, Fig. 1.

Figure 3 is an end elevation on a reduced scale of parts seen in Fig. 1, looking to the left, the casing and the yoke for operating the shiftable element being omitted.

Figure 4 is an enlarged fragmentary detail view, taken on line 4—4, Fig. 3.

This clutch comprises generally, driving and driven elements, one of which, as the driven element, is shiftable toward and from an engaging face of the other, means for shifting the shiftable element comprising an intermediate motion transmitting member and adjusting means for varying the starting position of said member.

The adjusting means is common to a plurality of said motion transmitting members, so that upon operation of the adjusting means, all of said members will at the same time receive the same adjustment.

1 is the driving element, which is usually the fly wheel of a motor, or engine, and 2 is a driven element located within a recess 3 on the rear face of the fly wheel, the driven element being in the illustrated construction of the invention, in the form of a friction plate, the margin of which extends between a pressure or compression ring 4, to be hereinafter described, located in the recess 3 and the opposing surface of the fly wheel 1 at the front of the recess 3. Preferably fibre disks or rings 5 are arranged on opposite sides of the margin of the plate 2. Said plate 2 is here shown as mounted on the hub 6 slidable on and rotatable with a driven shaft 7 arranged coaxial with the fly wheel 1. The hub 6 is suitably mounted on the shaft 7 to rotate therewith and usually the shaft 7 is splined or fluted and the hub 6 is formed with complemental splines or flutes.

9 and 10 are respectively spring abutments, the abutment 9 being provided within the rear end of a rearwardly extending hollow hub 91 on a shell 90 fixed to the fly wheel 1, and the abutment 10 being carried by a sleeve 100 slidable axially on the shaft 7 through the rear end of the hub 91. 11 is the compression spring inserted between the abutments 9 and 10 and encircling the sleeve 100 within the hub 91, said spring tending to force the shiftable sleeve 100 inwardly to hold the shiftable element or plate 2 engaged with the driving element or fly wheel 1. The sleeve 100 is the actuator for the members to be described, which transmit the compression movement to the clutch element 2. The shell 90 as here shown is provided with a flange 12 lapping the rear face of the fly wheel 1, and is secured thereto in any suitable manner, as by cap screws 13. The sleeve 100 may be of any suitable form, size and construction and it is operable in any suitable manner, as by a fork or yoke 14 mounted on a suitable shaft 15 and having arms which work in an annular groove 16 suitably provided in the sleeve 100. The shaft 15 is operated by a suitable pedal, as will be understood by those skilled in the art.

Preferably, the sleeve 100 consists of front and rear sections having overlapping contiguous ends, the rear section being provided with an annular shoulder forming the rear wall of the groove 16 and being spaced apart from the rear face of the front section of the sleeve, this rear face constituting the front wall of the groove 16, and the front section of the sleeve 100 having its periphery provided with an annular shoulder which constitutes the abutment 10, said inner sleeve being formed with an annular peripheral groove 20 for coacting with the inner ends of motion transmitting members or levers presently described. An antifriction bearing 101 is preferably interposed between the overlapping ends of the front and rear sections of the sleeve 100.

The motion transmitting members which shift the shiftable clutch element or plate 2 into engagement with the driving clutch element 1 and permit the same to move out of engagement therewith, preferably comprise a plurality of levers 17 spaced apart about the shaft 7 and extending outwardly relatively thereto. The levers 17 are carried by the shell 90 and rotatable with the driving element and each lever has an arm coacting with the shiftable sleeve 100 and another arm 18 coacting with the pressure or compression ring 4 or suitable engaging surface, as the periphery of a roller 19 carried by said ring, said arm 18 having a cam surface pressing against the roller. The rounding or cam surface of the arm 18 engages the periphery of the roller 19 in a straight line passing through the axis 21 and the axis of the roller. Owing to the use of the roller 19 and the arrangement of the cam surface of the arm 18 of the lever, wear between the cam surface and the roller is minimized, as when the friction between the cam surface and the roller is so great that the lever tends to bind or bite into the roller, the roller turns about its axis and hence wear on the cam surface or the periphery of the roller is avoided. As the motion of the roller 19 in its own bearings is comparatively small compared with the movement of the periphery of the roller, the wear at the bearings of the roller 19 is minimized and is practically inconsequential. In clutches of this type, a heavy spring of five hundred pounds more or less is used, and the pressure thereof is multiplied through the levers so that the pressure amounts to nearly a ton where applied to the rollers 19.

These rollers constitute engaging members carried by the pressure ring independently of each other and coacting individually with the actuating levers so that if one or more of the engaging members wears faster than the other or others on account of being of softer material, the clutch will operate through such other engaging member or members. The arm of the lever 17 which coacts with the shiftable sleeve 100 extends into a suitable annular groove 20 formed as stated at the inner end of the front section of said sleeve. The levers 17 are shiftable to vary the starting positions thereof, or to change the relative positions of their pivots 21, and in the embodiment of this invention, shown in Figure 1 said levers are not pivoted directly to the shell 90, but are pivoted to parts, as supports or carriages 22, which are individual to the levers, are supported independently of each other by the shell 90 and are revoluble with said shell, these carriages having a sliding movement, usually in a direction parallel to the axis of the clutch members, in order to carry the pivots 21 of the levers toward and from the shiftable clutch element 2, or the ring 4 and thus lengthen or shorten the distance the clutch element 2 must be shifted to fully engage with the driving element or fly wheel 1. As here shown Figs. 1 and 2, the parts 22 are slides of cylindrical cross section movable in suitable guides of cylindrical cross section formed in the shell 90 and extending parallel to the axis of the shaft 7, said slides 22 having their inner ends slotted at 23, the levers extend into the slots 23, and into companion slots 230 formed in the portion of the shell 90 between said guides and the longitudinal axis of the clutch, the walls of said slots engaging the sides of the levers and preventing them from moving about the longitudinal axes of the slides and the pivots 21 extending transversely through the slots 23.

Preferably the adjustment of all of the levers 17 or the supports or carriages 22 thereof is effected by means common to all of them, in order that all of the levers may receive exactly the same adjustment, this adjusting means being carried by the shell 90 concentric therewith. In the embodiment shown in Figure 1 said adjusting means comprises a ring 24 arranged in front of the rear end of the sleeve 100 and threading on the periphery of the rearwardly extending hub of the shell 90 and bearing against the rear ends of the supports or carriages 22. The ring is held in its adjusted position by a particularly simple and easily operable device, Fig. 4, consisting of a spring-pressed poppet 25 located in a recess 26, formed in the shell 90, the poppet moving out of the recess in position to extend into any one of a plurality of peripheral notches 27, Figure 3, in the ring 24.

When it is necessary to adjust the levers to take up wear the poppet 25 is pressed inwardly to release the ring 24 and the ring 24 is turned, and presses against the supports or carriages 22 to slide the same slightly inwardly and thus change the starting position of the levers 17 and at the same time move the compression ring 4 and friction plate 2 inwardly. When it is necessary to loosen the clutch to give the friction plate more play, the ring 24 is turned in the opposite direction, after being released from the poppet 25, so that the carriages 22 can be pressed outwardly by the action of the plate 2 on the ring 4 through the levers 17 and carriages 22.

The compression ring 4 rotates with the fly wheel, and, as here shown, it is carried by the shell 90 by means of a plurality of slidably interlocking parts provided at intervals on the shell 90 and the ring 4. These parts being shown in Fig. 1 as studs 28 extending from the shell 90 into the recess 3 of the fly wheel parallel to the axis of the clutch, and suitable sockets 30 formed on the rear face of the ring; the ring can thus slide axially on the studs 28, and the rotary movement of the fly wheel and the shell 90 is transmitted thereto through the studs 28.

31 is a suitable casing mounted on the shaft 7, enclosing the clutch mechanism just described, this casing being usually bolted to the engine casing, as will be understood by those skilled in the art. Said casing is omitted in Fig. 3.

What we claim is:

1. In combination, a driving clutch element, a driven clutch element, a shaft carrying the driven clutch element, a pressure ring carried by the driving clutch element and movable axially of the shaft for effecting operative engagement of the clutch elements, clutch operating levers spaced apart about the shaft and extending outwardly relatively thereto and having their outer ends pivoted to the driving clutch element and provided with engaging faces opposed to the pressure ring, rollers opposed to the engaging faces of the levers and carried by the pressure ring, the rollers engaging said faces substantially in straight lines passing through the axes of said levers and rollers, and means coacting with the inner ends of the levers for actuating them, substantially as and for the purpose described.

2. In combination, a driving clutch element, a driven clutch element, a shaft carrying the driven clutch element, a pressure ring carried by the driving clutch element and movable axially of the shaft for forcing the clutch elements into operative engagement, clutch operating levers spaced apart about the shaft and extending outwardly relatively thereto and having their outer ends pivoted to the driving clutch element and provided with convex faces opposed to the pressure ring, rollers opposed to the convex faces of the levers carried by the pressure ring, the rollers engaging said faces substantially in straight lines passing through the axes of said levers and rollers, and means coacting with the inner ends of the levers for actuating them, substantially as and for the purpose specified.

3. In combination, a driving clutch element, a driven clutch element, a shaft carrying the driven clutch element, a pressure ring carried by the driving clutch element and movable axially of the shaft for effecting operative engagement of the clutch elements, supports carried independently of each other by the driving clutch element and extending parallel with the shaft through portions of the exterior surface of a part of the driving clutch element, clutch operating levers individual to the supports and extending outwardly relatively to the shaft and having their outer ends pivotally supported by the ends of the supports nearest the pressure ring, said levers cooperating with the pressure ring, a ring movable circumferentially about the periphery of a part of the driving clutch element and coacting with the end faces of the projecting portions of the supports for moving said supports lengthwise of the axis of the shaft, and means coacting with the inner ends of the levers for actuating them, substantially as and for the purpose described.

4. In combination, a driving clutch element having a wall disposed at an angle to the longitudinal axis of the element and provided with a series of spaced apart openings of circular cross section extending through said wall substantially parallel to said axis, and also provided with a series of slots leading from corresponding ends of the openings toward said axis, a driven clutch element, a shaft carrying the driven clutch element, a pressure ring carried by the driving clutch element and movable axially of the clutch for effecting operative engagement of the clutch elements, supports of circular cross section mounted in the openings and movable axially thereof, clutch operating levers extending outwardly relatively to the shaft and through said slots, the outer ends of the levers being pivotally connected to the supports and coacting with the pressure ring, and the walls of the slots confining the levers from movement about the axes of the supports, means coacting with the supports for moving them axially, and means coacting with the inner ends of the levers for actuating them, substantially as and for the purpose described.

5. In combination, a driving clutch element provided with an engaging face and with a rearwardly extending hollow hub having a spring abutment within its rear end, a driven clutch element shiftable toward said engaging face, clutch operating levers extending at an angle relatively to the longitudinal axis of the clutch elements and having their outer ends movable to shift the driven element relatively to said engaging face, supports for said levers, the supports being carried by the driving element and shiftable in a direction parallel to the axis of said elements, means shiftable lengthwise of said hub and thrusting against the outer ends of said supports for adjusting them relatively to the driven clutch element, an actuator cooperating with the inner ends of the operating levers for rocking said levers, the actuator being arranged coaxially with the clutch elements and being axially slidable through the rear end of the hub, and a spring disposed within the hub and around the actuator and interposed between the abutment and the actuator, substantially as and for the purpose specified.

6. In combination, a driving clutch element provided with an internal cavity and with a rearwardly extending hollow hub having a spring abutment within its rear end, a driven clutch element arranged within the cavity, a shaft carrying the driven clutch element, a pressure ring carried by the driving clutch element and shiftable axially of the shaft for effecting operative engagement of the clutch elements, clutch operating levers extending at an angle relatively to the shaft and having their outer ends coacting with the pressure ring for operating said ring, supports individual to the levers and carried independently of each other by the driving clutch element, said supports being movable in a direction parallel to the axis of the shaft through portions of the exterior surface of the driving element, a ring movable circumferentially about the periphery of the hub at the rear of the supports and coacting with the projecting ends of the supports for moving the levers relatively to the pressure ring, an actuator cooperating with the inner ends of the operating levers for rocking said levers, the actuator being arranged coaxially with the clutch elements and being axially slidable through the rear end of the hub at the rear of the ring, and a spring disposed within the hub and around the actuator and interposed between the abutment and the actuator, substantially as and for the purpose set forth.

In testimony whereof, we have hereunto signed our names, at Syracuse, in the county of Onondaga and State of New York, this 25th day of July, 1919.

ALEXANDER T. BROWN.
GEORGE C. CARHART.